(12) United States Patent
Sakai et al.

(10) Patent No.: US 12,293,303 B2
(45) Date of Patent: May 6, 2025

(54) LEARNING DEVICE AND LEARNING METHOD

(71) Applicant: NEC Corporation, Tokyo (JP)

(72) Inventors: Tomoya Sakai, Tokyo (JP); Yasuhiro Sogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1016 days.

(21) Appl. No.: 17/297,181

(22) PCT Filed: Dec. 10, 2018

(86) PCT No.: PCT/JP2018/045321
§ 371 (c)(1),
(2) Date: May 26, 2021

(87) PCT Pub. No.: WO2020/121378
PCT Pub. Date: Jun. 18, 2020

(65) Prior Publication Data
US 2022/0027760 A1 Jan. 27, 2022

(51) Int. Cl.
*G06N 5/04* (2023.01)
*G06F 18/21* (2023.01)
*G06F 18/2431* (2023.01)

(52) U.S. Cl.
CPC .............. *G06N 5/04* (2013.01); *G06F 18/217* (2023.01); *G06F 18/2431* (2023.01)

(58) Field of Classification Search
CPC ............ G06N 5/04; G06N 5/01; G06N 20/10; G06N 20/00; G06F 18/217; G06F 18/2431
See application file for complete search history.

(56) References Cited

U.S. PATENT DOCUMENTS

2017/0249234 A1* 8/2017 Kalech ................ G06F 11/0793

FOREIGN PATENT DOCUMENTS

JP 2011-123574 A 6/2011

OTHER PUBLICATIONS

Zhang et al., [NPL] "Zero-Shot Recognition via Structured Prediction", Published Sep. 16, 2016 (Springer Link) total 31 pages (Year: 2016).*
International Search Report of PCT Application No. PCT/JP2018/045321 mailed Mar. 12, 2019.
English translation of Written opinion for PCT Application No. PCT/JP2018/045321 mailed Mar. 12, 2019.
Romeraparedes et al., "An embarrassingly simple approach to zero-shot learning", Proceedings of the 32nd International Conference on Machine Learning, 2015, vol. 37.
Ota et al., "Accelerated Character Recognition Using a Regression-Tree-Molding", IEICE Technical Report, Dec. 10, 2009, pp. 1-6, vol. 109, No. 344, ISSN 0913-5685, in particular, pp. 2-6.
Japanese Office Communication for JP Application No. 2020-558814 mailed on Nov. 15, 2022 with English Translation.

* cited by examiner

*Primary Examiner* — Quoc A Tran

(57) ABSTRACT

A learning device 100 includes correspondence inference unit which calculates outputs of predictors, which have learned for seen tasks or seen classes, for test input data, and infers correspondences between the calculated outputs and attribute information corresponding to an unseen task or an unseen class, and prediction unit which calculates a prediction output for the attribute information corresponding to the unseen task or the unseen class, using the inferred correspondences.

15 Claims, 5 Drawing Sheets

LEARNING DEVICE AND LEARNING METHOD

This application is a National Stage Entry of PCT/JP2018/045321 filed on Dec. 10, 2018, the contents of all of which are incorporated herein by reference, in their entirety.

TECHNICAL FIELD

The present invention relates to a learning device and a learning method that enable real-value prediction targeting unseen tasks or multi-class classification targeting unseen classes as well.

BACKGROUND ART

As a learning method that allows prediction even for unseen tasks or unseen classes, there is zero-shot learning using attributes, for example, as described in non-patent literature 1.

In zero-shot learning as described in non-patent literature 1, at first, a predictor is constructed using input/output data and attribute information as auxiliary information of seen tasks or seen classes. Then, using the constructed predictor, prediction is performed using the attribute information of a new task or a new class. The attribute information is, for example, a single or multiple continuous values or a categorical value that describe the task or the class. A new task or a new class is a task or a class that did not appear during learning. A new task or a new class is also called an unseen task or an unseen class.

CITATION LIST

Non-patent Literature

Non-patent Literature 1: B. Romera-Paredes and P. H. S. Torr, "An embarrassingly simple approach to zero-shot learning", Proceedings of the 32nd International Conference on Machine Learning, vol. 37, 2015, pp. 2152-2161

SUMMARY OF INVENTION

Technical Problem

In general, in zero-shot learning, a new predictor is constructed for all seen tasks or seen classes using input/output data and attribute information. In other words, existing prediction systems for seen tasks or seen classes are not utilized. In order to construct a predictor, various costs such as computational resources, computation time, and labor costs are required. In addition, if there are many prediction targets, the computational resources, computation time, and labor costs increase according to a number of prediction targets. Therefore, the cost of implementing a zero-shot learning method is high, such that a new predictor is required to be configured for an unseen task or an unseen class.

The purpose of this invention is to realize a learning device and a learning method for performing a prediction for unseen tasks or unseen classes at low cost.

Solution to Problem

The learning device according to the invention includes correspondence inference means for calculating outputs of predictors, which have learned for seen tasks or seen classes, for test input data, and inferring correspondences between the calculated outputs and attribute information corresponding to an unseen task or an unseen class, and prediction means for calculating a prediction output for the attribute information corresponding to the unseen task or the unseen class, using the inferred correspondences.

The learning method according to the present invention includes calculating outputs of predictors, which have learned for seen tasks or seen classes, for test input data, inferring correspondences between the calculated outputs and attribute information corresponding to an unseen task or an unseen class, and calculating a prediction output for the attribute information corresponding to the unseen task or the unseen class, using the inferred correspondences.

The learning program according to the present invention causes a computer to execute a process of calculating outputs of predictors, which have learned for seen tasks or seen classes, for test input data, a process of inferring correspondences between the calculated outputs and attribute information corresponding to an unseen task or an unseen class, and a process of calculating a prediction output for the attribute information corresponding to the unseen task or the unseen class, using the inferred correspondences.

Advantageous Effects of Invention

According to the present invention, a learning device and a learning method for performing a prediction for unseen tasks or unseen classes can be realized at low cost.

DESCRIPTION OF EMBODIMENTS

Figure 1:
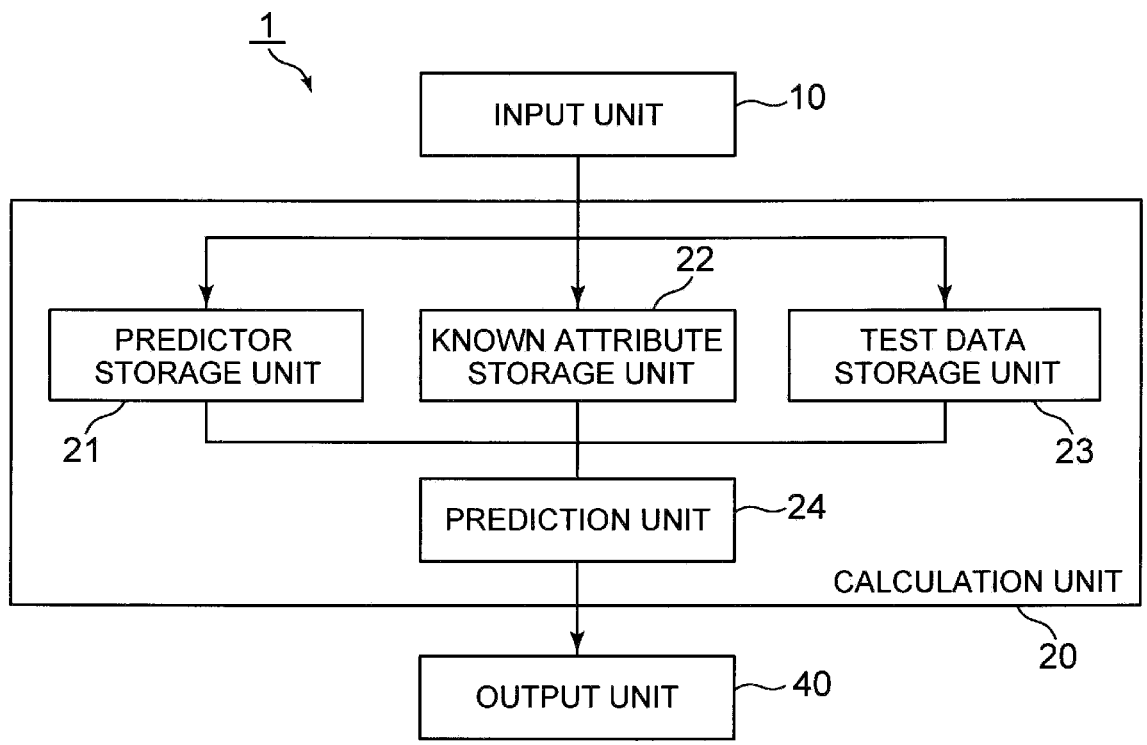
FIG. 1 It depicts a block diagram showing an example of a configuration of a learning device of the first example embodiment.

Hereinafter, example embodiments of the present invention will be described with reference to the drawings.

An input of a learning device is represented by x, an output of a learning device is represented by y, the predictor for each task or class t is represented by $h_t$, and the attribute information representing the characteristics of each task or class is represented by $a_t$. The learning device of the example embodiment uses added attribute information and a predictor already in operation to enable prediction for unseen tasks or unseen classes. The added attribute information is attribute information corresponding to the unseen task or unseen class. In addition, the predictor in operation is a trained predictor. In general, a label accompanies a class. The label may be included in the attribute information.

The input is represented as a d-dimensional vector. The output is represented as a scalar value. The domain (codomain) of the output value is a real number field in the real value prediction. The domain is a discrete set in the multi-class classification.

Assume that there are k seen tasks or k seen classes. Further, assume that there are k predictors already in operation, each corresponding to each of tasks or classes. There may be k individual predictors that return a scalar value, or there may be a single predictor that outputs k scalar values. For example, in the former case, assume that individual attribute vectors are obtained as attribute information $a_t$ for each predictor $h_t$. In the latter case, assume that a single attribute vector is obtained as attribute information $a_t$ for each output dimension of the predictor (the number of dimensions k corresponds to the number of tasks or classes). It is assumed that the attribute information is represented by an m-dimensional attribute vector.

The predictor $h_t$ in operation receives an input x. The predictor $h_t$ that implements real value prediction is a function that outputs a predicted value itself. The predictor $h_t$ that implements multi-class classification is a function that outputs a score (prediction score) that represents the degree to which the input x belongs to class t. The predictor that implements multi-class classification outputs a class with the highest score as the predicted class y.

Assume that as the predictor in operation, a predictor has been obtained that has learned a correspondence between input x and output y for each of seen tasks or seen classes, for example, by any statistical learning method or heuristics such as multi-output regression or deep learning.

Next, it will be described that a prediction method for an unseen task or unseen class, utilizing the predictor $h_t$ in operation. Hereinafter, the case where there are k individual predictors is taken as an example. The added attribute information (corresponding to the unseen task or unseen class) has been obtained in advance.

For the test input point to be predicted, an output value of the predictor in operation is obtained. Specifically, the predictors, which receive the test input data corresponding to the test input point, output predicted values or scores as the output values. Then, the predictor learns a correspondence between the obtained output value and known attribute vectors. For example, the known attribute vector and the output value of the corresponding predictor are input as an input/output pair to any existing learning algorithm to obtain the correspondence. The learning algorithm used is arbitrary. Ridge regression, random forest, and deep learning can be used as examples of learning algorithms. When a learning algorithm that is robust to noise is used, the effect of noise on the predictor and attribute information in a correspondence inference unit as described below will be reduced. For example, when the correspondence inference unit uses Huber regression or robust support vector regression, it is possible to learn the correspondence that is robust to errors in the predictor in operation and noises in the attribute information. Further, when a decision tree or a linear model is used for inferring a correspondence, the interpretation of the result becomes easy.

Instead of dealing with only one test input point, prediction considering multiple test input points is also possible. In this case, since for one known attribute vector, multiple output values of the corresponding predictor can be obtained, an algorithm for learning a multi-output output function can be used. In addition, various regularizations can be implemented that take into account information of the multiple test input points. That is, learning algorithms are used such as entropy regularization, manifold regularization, group regularization, structural regularization, etc., whose performance is improved by adding a term representing a constraint (prior knowledge) to the error function.

In the case of real value prediction, the prediction output (predicted value) for the attribute vector of the unseen task can be calculated using the obtained correspondence. In the case of multi-class classification, the score is output by calculating all predicted values for the attribute vector of seen classes and unseen classes using the obtained correspondence. The class with the highest score is then used as the label of the predicted class (predicted class label) for the test input data.

Next, a method for inferring a correspondence between the attribute information and the output of the predictor in operation will be explained. As an example, a method for using a linear model and interpreting the result will be explained. It is noted that the linear model is an example, and other types of models may be used.

When L1 regularization is used as the regularization, many of the parameters become zero, and interpretation of the obtained parameters is easier than L2 regularization, for example.

Therefore, when L1 regularization is used, visibility is improved when visualizing attribute information that is effective for prediction.

Furthermore, when there are multiple test data points, it is preferable to treat the test data points collectively, rather than estimating parameter vectors for those test data points individually. When the parameter vectors are treated collectively as a parameter matrix, it is possible to perform regularization on the parameter matrix. For example, $L\_\{2, 1\}$ regularization or trace-norm regularization can be applied. With such a process, it can be possible to select a few seen tasks or seen classes that explain a predicted value well and visualize the result.

Next, an example of the configuration of an example embodiment of a learning device.

FIG. 1 is a block diagram showing an example of a configuration of a learning device of the first example embodiment. As shown in FIG. 1, the learning device 1 includes an input unit 10, a calculation unit 20, and an output unit 40.

When real value prediction is performed, the input unit 10 inputs predictors, test input data to be subjected to the real value prediction, and attribute information for each task. For example, the predictor corresponding to each task, and the attribute information in which known characteristics of each task is described, as known attribute information, are input to the input unit 10. In addition, the test input data for which prediction result is desired and the attribute information of the unseen task are input to the input unit 10 as test data.

When multi-class classification is performed, the input unit 10 inputs predictors, the test input data to be subjected to multi-class classification, and attribute information in which known characteristics of for each class is described. For example, the predictor corresponding to each class, and the attribute information in which known characteristics of each class is described, as known attribute information, are input to the input unit 10. In addition, the test input data for which prediction result is desired and the attribute information of the unseen class are input to the input unit 10 as test data.

The calculation unit 20 includes a predictor storage unit 21, a known attribute storage unit 22, a test data storage unit 23, and a prediction unit 24.

The prediction unit 24 reads data (i.e., the test input data) required for prediction from the test data storage unit 23. The prediction unit 24 then infers the correspondence between an output result of the predictor for the test input data and a plurality of attribute vectors stored in the known attribute storage unit 22. Furthermore, the prediction unit 24 calculates a predicted value for the test input data and the attribute information of the unseen task or the unseen class using the inferred correspondence.

When real value prediction is performed, i.e., when the prediction unit 24 that performs real value prediction is provided, the output unit 40 outputs the predicted value calculated by the prediction unit 24 as the prediction result (prediction output). When multi-class classification is performed, i.e., when the prediction unit 24 that performs multi-class classification is provided, the output unit 40 outputs the prediction score and the predicted class calculated by the prediction unit 24 as the prediction result (prediction output).

Figure 2:
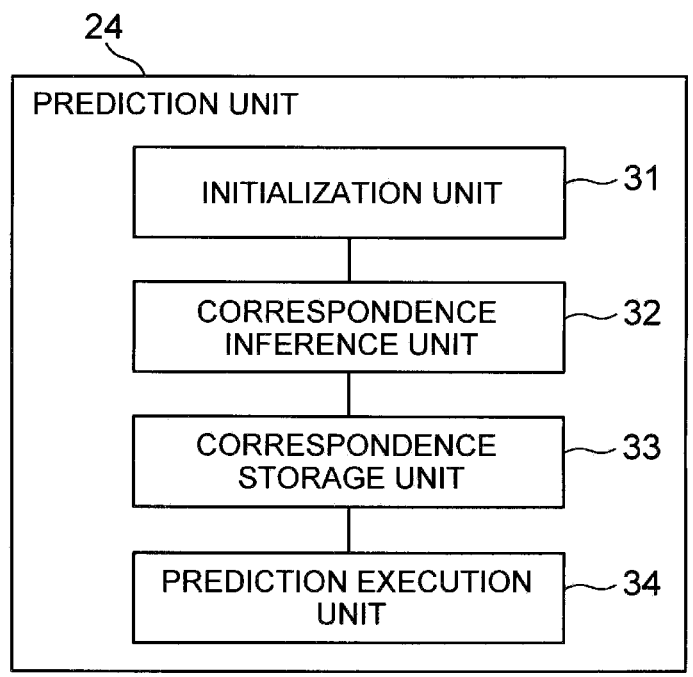
FIG. 2 It depicts a block diagram showing an example of a configuration of a prediction unit.

FIG. 2 is a block diagram showing an example of a configuration of the prediction unit 24. As shown in FIG. 2, the prediction unit 24 includes an initialization unit 31, a correspondence inference unit 32, a correspondence storage unit 33, and a prediction execution unit 34.

The initialization unit 31 reads predictors in operation from the predictor storage unit 21. The initialization unit 31 reads attribute vectors of seen tasks or seen classes from the known attribute storage 22. Furthermore, the initialization unit 31 reads data for which prediction results are required and attribute vectors of the tasks or the classes from the test data storage 23.

The correspondence inference unit 32 obtains an output of the learned predictor (predictor in operation) for the test input data. Then, the correspondence inference unit 32 infers correspondences between the output of the predictor and the plurality of attribute vectors read from the known attribute storage unit 22. The correspondence storage unit 33 stores the inferred correspondences.

The prediction execution unit 34 calculates the predicted output for the attribute information corresponding to the unseen task or the unseen class using the correspondence stored in the correspondence storage unit 33.

Figure 3:
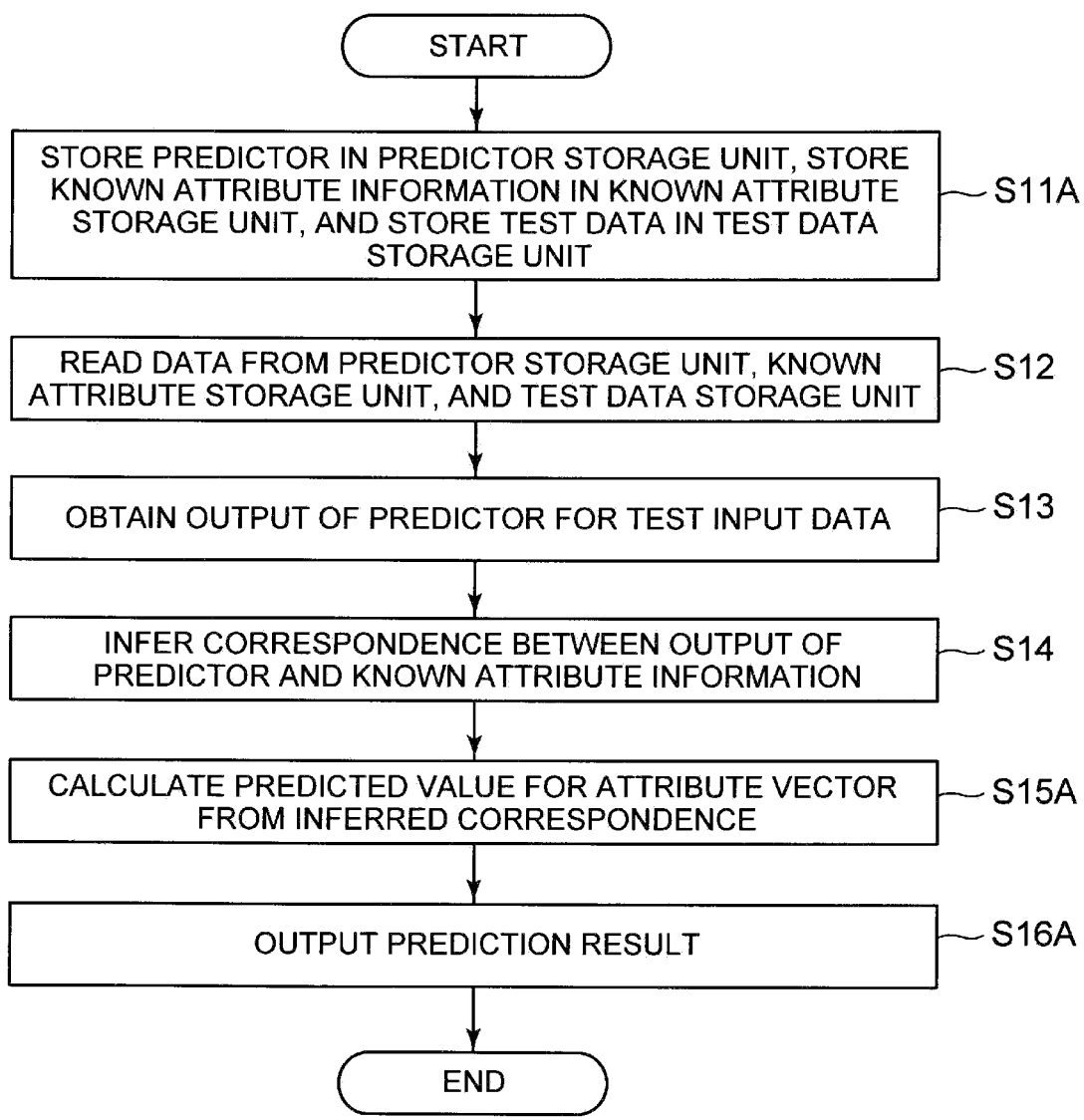
FIG. 3 It depicts a flowchart showing an operation of the learning device including a prediction unit that performs real value prediction.

Next, the operation of the learning device 1 will be described with reference to the flowcharts in FIGS. 3 and 4. FIG. 3 is a flowchart showing an operation of the learning device 1 including the prediction unit 24 that performs real value prediction.

When real value prediction is performed, the input unit 10 stores the predictor in each input task in the predictor storage unit 21 (Step S11A). The input unit 10 stores the attribute information in which the characteristics of each input task is described as known attribute information in the known attribute storage unit 22 (Step S11A). The input unit 10 stores the inputted test input data and the inputted attribute information of unseen task as test data in the test data storage unit 23 (Step S11A). The test input data is data for which a prediction result is desired.

The prediction unit 24 reads the predictors and the data described above from the predictor storage unit 21, the known attribute storage unit 22, and the test data storage unit 23 (Step S12). Specifically, in the prediction unit 24, the initialization unit 31 reads out the predictors from the predictor storage unit 21. The initialization unit 31 reads out the attribute vectors of the seen task from the known attribute storage unit 22. The initialization unit 31 reads the test input data and the attribute vector of the unseen task from the test data storage unit 23.

Next, the prediction unit 24 obtains outputs of the predictor for the test input data (Step S13). Specifically, in the prediction unit 24, the correspondence inference unit 32 obtains the outputs of the predictors for the test input data read from the test data storage unit 23 using the predictors read from the predictor storage unit 21.

Next, the correspondence inference unit 32 infers the correspondence between the output of the predictor and the known attribute information using a predetermined algorithm for inference (Step S14). The prediction unit 24 uses, for example, regularized least squares method, support vector regression, or random forest as the predetermined algorithm. The correspondence inference unit 32 stores the inferred correspondence in the correspondence storage unit 33.

Then, the prediction execution unit 34 calculates an output for the attribute of the task to be predicted using the correspondence stored in the correspondence storage unit 33. Specifically, the prediction execution unit 34 calculates an output of each predictor for the attribute vector read from the test data storage unit 23 (Step S15A). The output unit 40 outputs the calculated prediction results (Step S16A).

Figure 4:
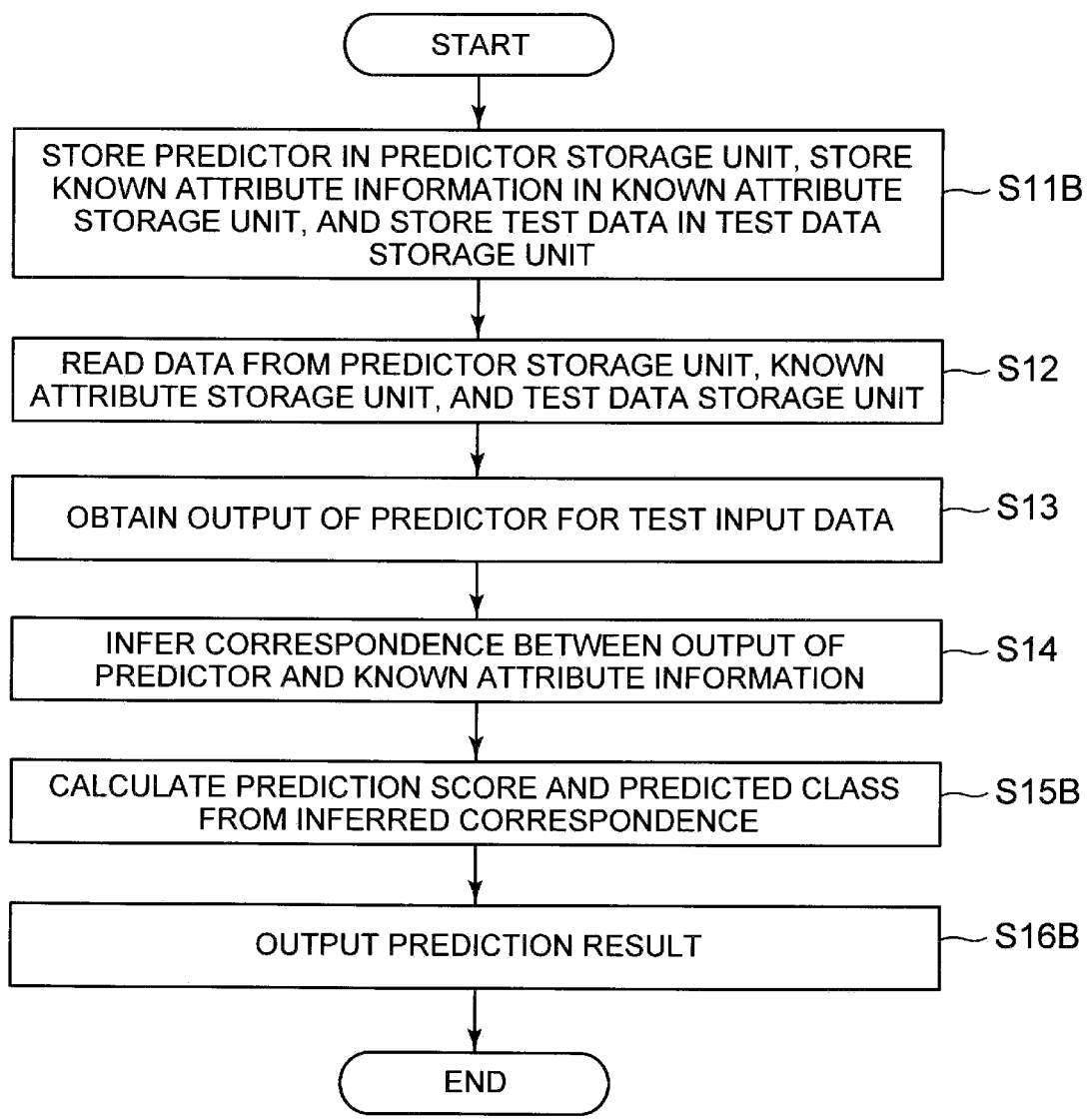
FIG. 4 It depicts a flowchart showing an operation of the learning device including a prediction unit that performs multi-class classification.

FIG. 4 is a flowchart showing an operation of the learning device 1 including the prediction unit 24 that performs multi-class classification.

When multi-class classification is performed, the input unit 10 stores the predictor in each input class in the predictor storage unit 21 (Step S11B). The input unit 10 stores the attribute information in which the characteristics of each input class is described as known attribute information in the known attribute storage unit 22 (Step S11B). The input unit 10 stores the inputted test input data and the inputted attribute information of unseen class as test data in the test data storage unit 23 (Step S11B). The test input data is data for which a prediction result is desired.

The prediction unit 24 performs the same processes as in steps S12 through S14 shown in FIG. 3. However, the initialization unit 31 reads attribute vectors of the seen classes from the known attribute storage unit 22 in the process of step S12.

Then, the prediction execution unit 34 calculates an output for the attribute of the task to be predicted using the correspondence stored in the correspondence storage unit 33. Specifically, the prediction execution unit 34 calculates an output of each predictor for the attribute vector read from the test data storage unit 23. In other words, the prediction execution unit 34 calculates a prediction score and predicted class using the correspondence stored in the correspondence storage unit 33 (Step S15B). The output unit 40 outputs the calculated prediction results. For example, the prediction unit 24 outputs a class with the highest prediction score as the predicted class, or outputs a label corresponding to the predicted class as the predicted label.

As explained above, the learning device 1 of this example embodiment performs learning based on zero-shot learning. When performing prediction for the unseen task or the unseen class, the learning device 1 does not generate new predictors, but utilizes existing predictors that have already been learned. Therefore, the learning device can be obtained at low cost.

EXAMPLE 1

As an example of the learning device 1 that includes the prediction unit 24 that performs real value prediction, a learning device that performs product demand forecasting will be explained.

In the learning device 1, the predictor storage unit 21 stores predictors in operation. Each predictor performs demand forecasting for each of several existing products. In the known attributes storage unit 22, the attribute vectors are stored for the existing products by converting the product names, raw materials, and nutritional components into appropriate statistics. The test data storage unit 23 stores an attribute vector for new product and information on the date, time, and weather conditions for which prediction is to be made as test data.

In this example, the learning device 1 predicts the demand for a product as a task. Referring to the flowchart in FIG. 3, in step S14, the correspondence inference unit 32 infers correspondences between the attribute information of the product and demand forecasting values of the product, for example, by the regularized least squares method, using outputs of the predictors and the known attribute information read from the known attribute storage unit 22. In step S15A, the prediction execution unit 34 calculates the demand forecasting value corresponding to the attribute information of the new product based on the inferred correspondences. The output unit 40 outputs the calculated demand forecasting value.

EXAMPLE 2

As an example of the learning device 1 that includes the prediction unit 24 that performs multi-class classification, a learning device that performs news article classification will be explained.

In this example, the predictor storage unit 21 stores predictors. Each predictor predicts a category to which a news article belongs in a news distribution site. In the known attributes storage unit 22, statistics indicating the characteristics of the category are stored as attribute vectors. The test data storage unit 23 stores the attribute information of a newly added category and a new news article.

Referring to the flowchart in FIG. 4, in step S14, the correspondence inference unit 32 the correspondence inference unit 32 infers correspondences between the known attribute information and prediction scores by appropriate learning algorithm, using prediction scores of the predictors and the known attribute information. In step S15B, the prediction execution unit 34 calculates a prediction score for the attribute of the newly added class based on the inferred correspondences. Then, the prediction execution unit 34 selects a category corresponding to the attribute information with the highest prediction score as the predicted label among the prediction scores of the known attribute information and the newly calculated prediction score. The output unit 40 outputs the calculated predicted labels and the prediction score.

EXAMPLE 3

The output unit 40 in the example embodiment can also visualize the obtained result. An example of the visualization is described below.

For example, by using a learning algorithm that is a linear model with additional regularization to make it easy to interpret, the output unit 40 can display the parameters of the linear model in a visual form.

Figure 5:
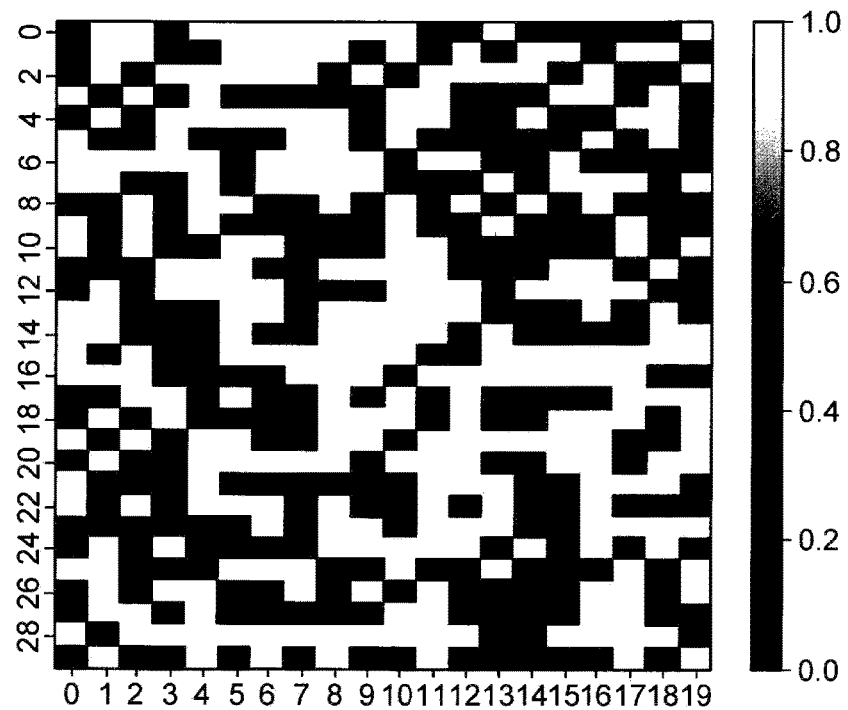
FIG. 5 It depicts an explanatory diagram of a display example of contribution degree of attribute information to the predicted value.

FIG. 5 is an explanatory diagram of a display example of contribution degree of attribute information to the predicted value. As mentioned above, when L1 regularization or the like is used in the process of the correspondence inference unit 32, the number of parameters is reduced. When applied to this example, only the attribute information that contributes to the predicted value is selected.

In FIG. 5, the horizontal axis indicates the attribute information. In this example, it is assumed that the attribute information is represented by a 20-dimensional attribute vector. The numbers on the horizontal axis correspond to respective dimensions of the 20-dimensional attribute vector. The vertical axis indicates the number of the test input point. The white display corresponds to the attribute information used for prediction. The black display corresponds to attribute information that was rarely used for prediction (parameter values are quite small). The user of the learning device 1 can visually see which attribute information contributes to the predicted value of the test input point.

The output unit 40 is connected to a display unit or the like that displays the information illustrated in FIG. 5. The output unit 40 may also be positioned as including a display unit or the like.

The output unit 40 may binarize the obtained parameter values and display whether or not the attribute information is used by the binarized parameter values, or the output unit 40 may display the obtained parameter values as they are. In that case, the degree of influence of the attribute information on the prediction becomes visible.

In addition, the output unit 40 can also display various relationships of attributes, parameters, and predicted values, depending on the regularization and test input data points utilized.

EXAMPLE 4

When the prediction unit 24 uses algorithm that makes the process of calculating a predicted value easy to interpret, such as a decision tree as algorithm for learning a correspondence, the output unit 40 can show the process of calculating a predicted value in a graph.

Figure 6:
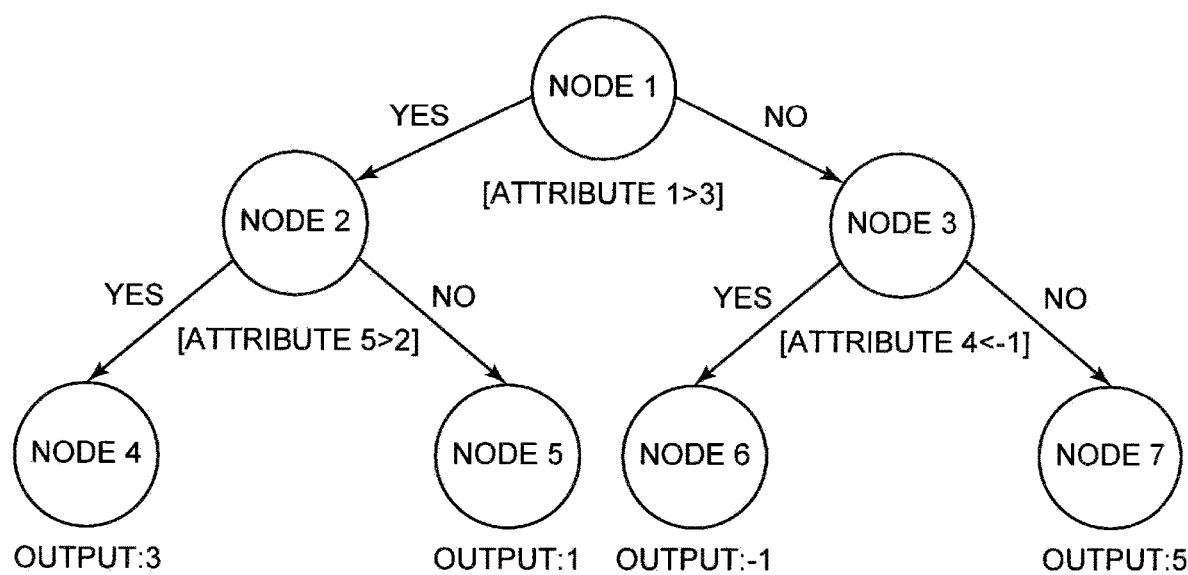
FIG. 6 It depicts an explanatory diagram of an example of a displayed graph.

FIG. 6 is an explanatory diagram of an example of a displayed graph. As mentioned above, using a decision tree or a linear model for inferring correspondence makes it easy to interpret the results. For example, when the results are displayed, the results are easier to see.

In this example, a decision tree is used in the processing of the correspondence inference unit 32.

In the example shown in FIG. 6, for example, when the values corresponding to attributes 1 through 5 are represented by (7, 5, 4, 3, −3) as an attribute vector of an unseen task, it is visible that the prediction execution unit 34 returns 1 as the prediction output (predicted value) through node 1, node 2, and node 5.

In addition, the output unit 40 is connected to a display unit or the like that performs the display illustrated in FIG. 6. The output unit 40 may also be positioned as including a display unit or the like.

Figure 7:
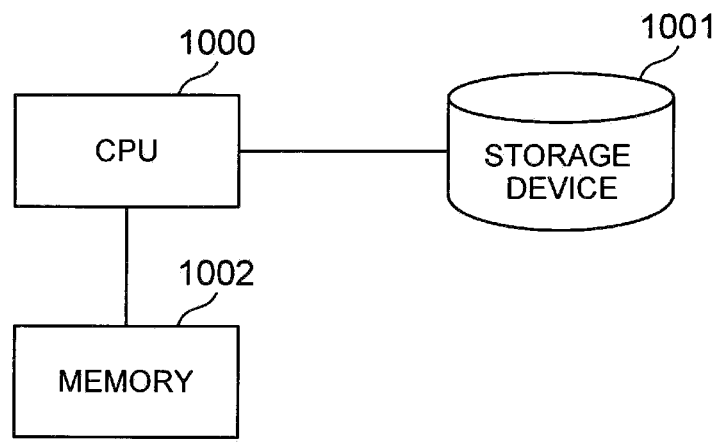
FIG. 7 It depicts a block diagram of an example of a computer including a CPU.

FIG. 7 is a block diagram showing an example of the computer having a CPU (Central Processing Unit). The computer is implemented in learning device 1. The CPU 1000 executes processing in accordance with a program stored in the storage device 1001 to realize the functions in the above exemplary embodiment. In other words, the computer realizes functions other than each storage unit in the calculation unit 20 in the learning device 1 shown in FIG. 1. The computer also realizes the functions of the initialization unit 31 and the correspondence inference unit 32 in the prediction unit 24 shown in FIG. 2. A GPU (Graphics Processing Unit) may be used in place of the CPU 1000 or together with the CPU 1000.

The storage device 1001 is, for example, a non-transitory computer readable medium. The non-transitory computer readable medium includes various types of tangible storage media. Specific examples of the non-transitory computer readable medium include magnetic storage media (for example, flexible disk, magnetic tape, hard disk), magneto-optical storage media (for example, magneto-optical disc), compact disc-read only memory (CD-ROM), compact disc-recordable (CD-R), compact disc-rewritable (CD-R/W), and semiconductor memories (for example, mask ROM, programmable ROM (PROM), erasable PROM (EPROM), flash ROM).

The program may also be stored on various types of transitory computer readable media. The temporary computer readable medium is supplied with the program, for example, via wired or wireless communication channels, i.e., via electrical signals, optical signals, or electromagnetic waves.

The program may be stored in various types of transitory computer readable media. The transitory computer readable medium is supplied with the program through, for example, a wired or wireless communication channel, or, via electric signals, optical signals, or electromagnetic waves.

Figure 8:
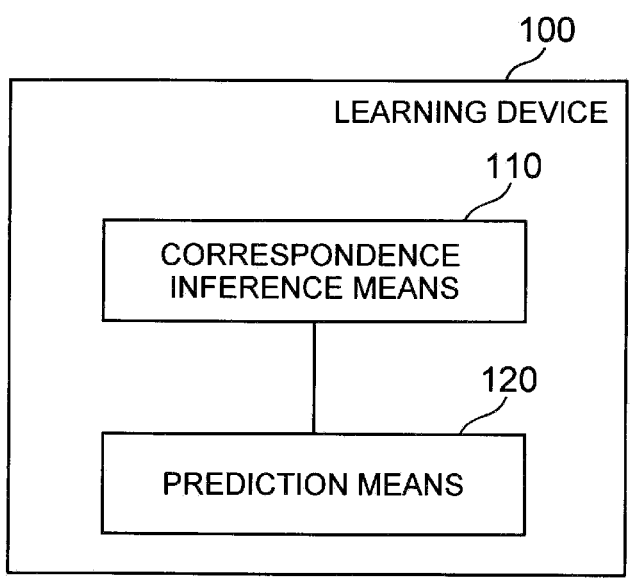
FIG. 8 It depicts a block diagram of the main part of the learning device.

FIG. 8 is a block diagram of the main part of the learning device. The learning device 100 shown in FIG. 8 comprises correspondence inference means 110 (in the example embodiment, realized by the correspondence inference unit 32) for calculating outputs of predictors, which have learned for seen tasks or seen classes, for test input data, and inferring correspondences between the calculated outputs and attribute information corresponding to an unseen task or an unseen class, and prediction means 120 (in the example embodiment, realized by the prediction execution unit 34) for calculating a prediction output for the attribute information corresponding to the unseen task or the unseen class, using the inferred correspondences.

A part of or all of the above example embodiments may also be described as, but not limited to, the following supplementary notes.

(Supplementary note 1) A learning device comprising:
correspondence inference means for calculating outputs of predictors, which have learned for seen tasks or seen classes, for test input data, and inferring correspondences between the calculated outputs and attribute information corresponding to an unseen task or an unseen class, and
prediction means for calculating a prediction output for the attribute information corresponding to the unseen task or the unseen class, using the inferred correspondences.

(Supplementary note 2) The learning device of Supplementary note 1, wherein
the correspondence inference mean uses algorithm to which prior knowledge is considered, when multiple test input data points are used.

(Supplementary note 3) The learning device of Supplementary note 1 or 2,
wherein the correspondence inference mean uses algorithm can reduce a number of attribute information which contributes to the prediction output, and
wherein the learning device further comprises an output unit which visibly displays the attribute information which contributes to the prediction output.

(Supplementary note 4) The learning device of Supplementary note 3,
wherein the output unit displays numbers respectively indicating degree of influence of the attribute information which contributes to the prediction output.

(Supplementary note 5) The learning device of Supplementary note 1 or 2,
wherein the correspondence inference mean uses algorithm making it easy to interpret processing result, and
wherein the learning device further comprises an output unit which display a process of calculating the prediction output in a graph.

(Supplementary note 6) A learning method comprising:
calculating outputs of predictors, which have learned for seen tasks or seen classes, for test input data,
inferring correspondences between the calculated outputs and attribute information corresponding to an unseen task or an unseen class, and
calculating a prediction output for the attribute information corresponding to the unseen task or the unseen class, using the inferred correspondences.

(Supplementary note 7) The learning method of Supplementary note 6, wherein
when inferring correspondences, using algorithm to which prior knowledge is considered, when multiple test input data points are used.

(Supplementary note 8) The learning method according to claim 6 or 7, wherein
when inferring correspondences, using algorithm can reduce a number of attribute information which contributes to the prediction output, and
the attribute information which contributes to the prediction output is visibly displayed on a display unit.

(Supplementary note 9) The learning method of Supplementary note 8,
wherein the output unit displays on a display unit numbers respectively indicating degree of influence of the attribute information which contributes to the prediction output.

(Supplementary note 10) The learning method of Supplementary note 6 or 7,
wherein when inferring correspondences, using algorithm making it easy to interpret processing result, and
wherein the learning method further comprises displaying on a display unit a process of calculating the prediction output in a graph.

(Supplementary note 11) A learning program causing a computer to execute:
a process of calculating outputs of predictors, which have learned for seen tasks or seen classes, for test input data,
a process of inferring correspondences between the calculated outputs and attribute information corresponding to an unseen task or an unseen class, and
a process of calculating a prediction output for the attribute information corresponding to the unseen task or the unseen class, using the inferred correspondences.

(Supplementary note 12) The learning program of Supplementary note 11, wherein
when inferring correspondences, the learning program causes the computer to use algorithm to which prior knowledge is considered, when multiple test input data points are used.

(Supplementary note 13) The learning program of Supplementary note 11 or 12, wherein
the learning program causes the computer to
use algorithm can reduce a number of attribute information which contributes to the prediction output, when inferring correspondences, and
visibly display on a display unit the attribute information which contributes to the prediction output.

(Supplementary note 14) The learning program of Supplementary note 13, wherein
the learning program causes the computer to display on a display unit numbers respectively indicating degree of influence of the attribute information which contributes to the prediction output.

(Supplementary note 15) The learning program of Supplementary note 11 or 12, wherein
the learning program causes the computer to
use algorithm making it easy to interpret processing result, when inferring correspondences, and
display on a display unit a process of calculating the prediction output in a graph.

(Supplementary note 16) A learning method, implemented by a computer, comprising:
calculating outputs of predictors, which have learned for seen tasks or seen classes, for test input data,
inferring correspondences between the calculated outputs and attribute information corresponding to an unseen task or an unseen class, and
calculating a prediction output for the attribute information corresponding to the unseen task or the unseen class, using the inferred correspondences.

REFERENCE LIST 1, 100 Learning device
10 Input unit
20 Calculation unit
21 Predictor storage unit
22 Known attribute storage unit
23 Test data storage
24 Prediction unit
31 Initialization unit
32 Correspondence inference unit
33 Correspondence Storage unit
34 Prediction Execution unit
40 Output unit
110 Correspondence inference means
120 Prediction means
1000 CPU
1001 Storage unit
1002 Memory

What is claimed is:

1. A learning device comprising:
a memory storing software instructions; and
at least one processor configured to execute the software instructions to perform:
storing, in a predictor storage, one existing predictors that have already been learned for seen tasks or seen classes via one-shot learning, each existing predictor having a corresponding seen task or a corresponding seen class;
for each existing predictor, storing an attribute vector of the corresponding seen task or the corresponding seen class, in an attribute storage;
for each existing predictor, calculating an prediction score for test input data, wherein the prediction score indicates a likelihood the test input data is the corresponding seen task of the existing predictor or belongs to the corresponding seen class of the existing predictor;
for each existing predictor, inferring correspondence between an attribute vector of an unseen task or an unseen class and the corresponding attribute vector or the corresponding seen class of the existing predictor, wherein the unseen task or the unseen class is a task or class for which an existing predictor has not already been learned;
calculating a prediction score for the test input data for the unseen task or the unseen class indicating a likelihood that the test input data is the unseen task or belongs to the unseen class, based on the calculated prediction score and the inferred correspondence for each existing predictor; and
outputting the calculated prediction score indicating the likelihood that the test input data is the unseen task or belongs to the unseen class.

2. The learning device according to claim 1, wherein
the at least one processor is configured to execute the software instructions to using an algorithm to which prior knowledge is considered, when multiple test input data points are used for the test input data.

3. The learning device according to claim 1, wherein
the at least one processor is configured to execute the software instructions to using an algorithm to reduce a number of attribute information which contribute to prediction output, and
wherein the learning device further comprises an output unit which visibly displays the attribute information which contribute to the prediction output.

4. The learning device according to claim 3,
wherein the output unit displays numbers respectively indicating degrees of influence of the attribute information which contribute to the prediction output.

5. The learning device according to claim 1, wherein
the at least one processor is configured to execute the software instructions to using an algorithm to ease interpretation of a processing result, and
wherein the learning device further comprises an output unit which displays a process of calculating a prediction output in a graph.

6. A computer-implemented learning method comprising:
storing, in a predictor storage, one existing predictors that have already been learned for seen tasks or seen classes via one-shot learning, each existing predictor having a corresponding seen task or a corresponding seen class;
for each existing predictor, storing an attribute vector of the corresponding seen task or the corresponding seen class, in an attribute storage;
for each existing predictor, calculating an prediction score for test input data, wherein the prediction score indicates a likelihood the test input data is the corresponding seen task of the existing predictor or belongs to the corresponding seen class of the existing predictor;
for each existing predictor, inferring correspondence between an attribute vector of an unseen task or an unseen class and the corresponding attribute vector or the corresponding seen class of the existing predictor, wherein the unseen task or the unseen class is a task or class for which an existing predictor has not already been learned;
calculating a prediction score for the test input data for the unseen task or the unseen class indicating a likelihood that the test input data is the unseen task or belongs to the unseen class, based on the calculated prediction score and the inferred correspondence for each existing predictor; and outputting the calculated prediction score indicating the likelihood that the test input data is the unseen task or belongs to the unseen class.

7. The computer-implemented learning method according to claim 6, wherein when inferring correspondences, using an algorithm to which prior knowledge is considered, when multiple test input data points are used for the test input data.

8. The computer-implemented learning method according to claim 6, when inferring correspondences, using an algorithm to reduce a number of attribute information which contribute to prediction output, and the attribute information which contribute to the prediction output is visibly displayed on a display unit.

9. The computer-implemented learning method according to claim 8, wherein numbers respectively indicating degrees of influence of the attribute information which contribute to the prediction output are displayed on a display unit.

10. The computer-implemented learning method according to claim 6, wherein when inferring correspondences, using an algorithm to ease interpretation of a processing result, and wherein the learning method further comprises displaying on a display unit a process of calculating a prediction output in a graph.

11. A non-transitory computer readable recording medium storing a learning program executable by a processor to perform processing comprising:

storing, in a predictor storage, one existing predictors that have already been learned for seen tasks or seen classes via one-shot learning, each existing predictor having a corresponding seen task or a corresponding seen class;

for each existing predictor, storing an attribute vector of the corresponding seen task or the corresponding seen class, in an attribute storage;

for each existing predictor, calculating an prediction score for test input data, wherein the prediction score indicates a likelihood the test input data is the corresponding seen task of the existing predictor or belongs to the corresponding seen class of the existing predictor;

for each existing predictor, inferring correspondence between an attribute vector of an unseen task or an unseen class and the corresponding attribute vector or the corresponding seen class of the existing predictor, wherein the unseen task or the unseen class is a task or class for which an existing predictor has not already been learned;

calculating a prediction score for the test input data for the unseen task or the unseen class indicating a likelihood that the test input data is the unseen task or belongs to the unseen class, based on the calculated prediction score and the inferred correspondence for each existing predictor; and outputting the calculated prediction score indicating the likelihood that the test input data is the unseen task or belongs to the unseen class.

12. The non-transitory computer readable recording medium according to claim 11, wherein in the process, when inferring correspondences, using an algorithm to which prior knowledge is considered, when multiple test input data points are used for the test input data.

13. The non-transitory computer readable recording medium according to claim 11, wherein in the process, when inferring correspondences, using an algorithm to reduce a number of attribute information which contribute to prediction output and the attribute information which contribute to the prediction output is visibly displayed on a display unit.

14. The non-transitory computer readable recording medium according to claim 13, wherein numbers respectively indicating degrees of influence of the attribute information which contribute to the prediction output are displayed on a display unit.

15. The non-transitory computer readable recording medium according to claim 11, wherein in the process, when inferring correspondences, using an algorithm to ease interpretation of a processing result and the processing further comprises displaying on a display unit a process of calculating a prediction output in a graph.

* * * * *